2,898,586

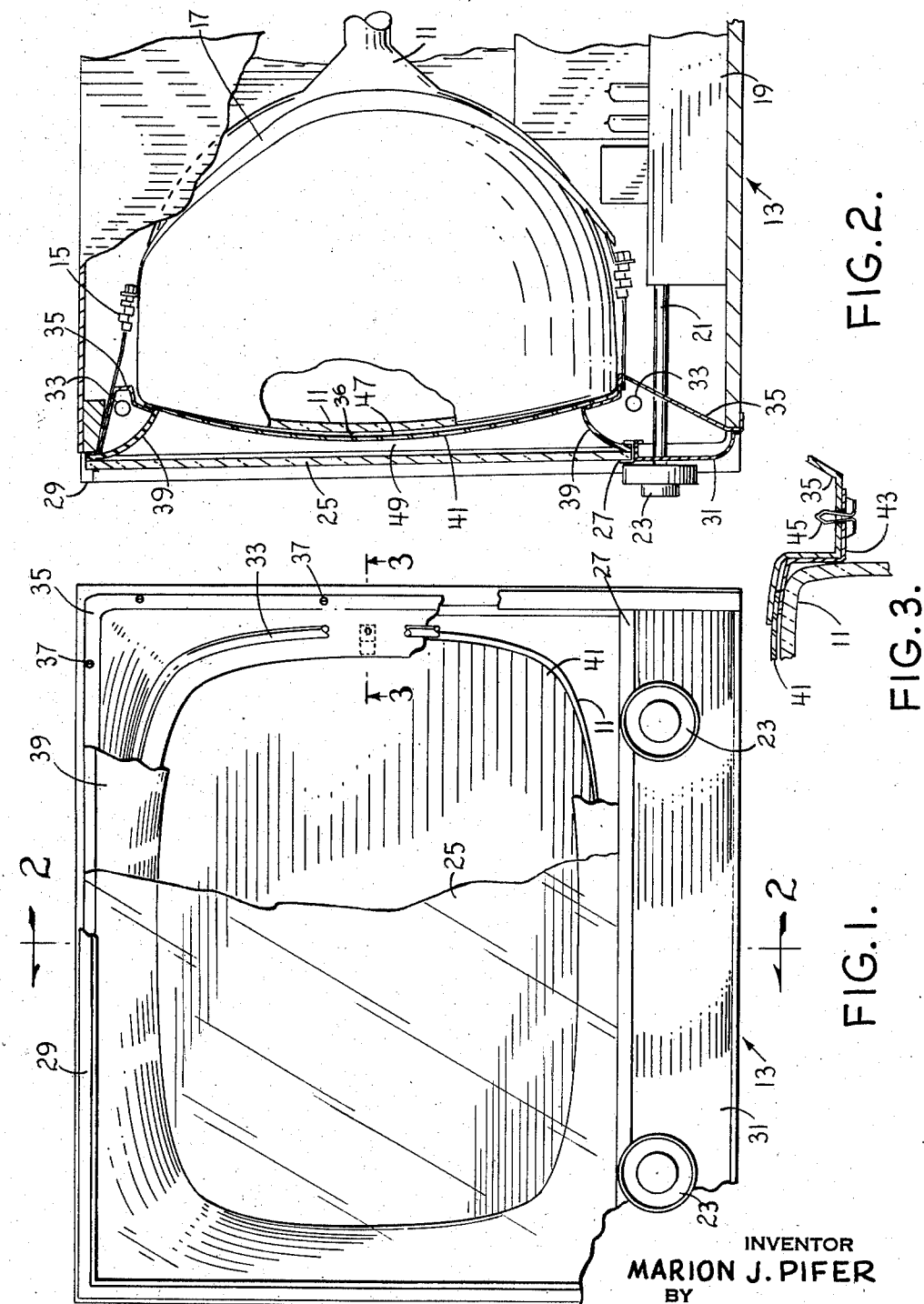

TELEVISION APPARATUS

Marion J. Pifer, Williamsville, N.Y., assignor, by mesne assignments, to Sylvania Electric Products Inc., Wilmington, Del., a corporation of Delaware Application June 25, 1956, Serial No. 593,497

2 Claims. (Cl. 340—369)

This invention relates to television receiving apparatus and more particularly to an image display tube and cabinet face plate assembly for apparatus of this type.

A television picture tube is generally mounted in the receiver so that the viewing surface of the tube is in close proximity of the glass face plate of the cabinet. In order to reduce dilution of the image by ambient light, this face plate is very often color tinted to filter certain regions of the ambient light spectrum. In addition to being tinted, the glass is tempered to minimize possible damage resulting from glass breakage in the event of an implosion of the picture tube.

Although the glass face plate described above reduces the ambient light and implosion problems, it has not provided an acceptable solution for these problems from the viewpoint of appearance or cost.

Accordingly, it is an object of the invention to reduce the aforementioned disadvantages and to provide an improved television apparatus.

A further object is the provision of an improved picture tube and cabinet face plate assembly.

The foregoing objects are achieved in one aspect of the invention by the provision of a plastic filter lens which is mounted in close proximity to the viewing surface of the picture tube. A confined air space is formed between portions of the filter and the viewing surface. The face plate of the cabinet is held in spaced relationship with the filter to provide a second confined air space. The combination of this filter lens and two serially arrayed air spaces between the picture tube and an observer reduces ambient light dilution of the image and minimizes possible damage resulting from picture tube implosion.

For a better understanding of the invention, reference is made to the following description taken in conjunction with the accompanying drawings in which:

Fig. 1 is a partially sectioned plan view of a television receiver;

Fig. 2 is a view taken along line 2—2 of Fig. 1; and

Fig. 3 is a view taken along line 3—3 of Fig. 1.

Referring to the drawings, an image display tube 11 is shown mounted in cabinet 13 by means of brackets 15 and strap 17. The chassis 19 for the receiver is positioned beneath tube 11, and has tuning control shafts 21 extending therefrom to the front of the cabinet where they are connected to tuning knobs 23.

The front or viewing area of cabinet 13 has a glass face plate 25 which is held in position by trim rail 27 and molding 29. Plate 25 may be made of untempered crystal clear glass with a thickness of approximately 7/32 of an inch. The bottom of the front portion of cabinet 13 has a knob rail 31 formed at one end to abut trim rail 27. The opposite end of rail 31 is affixed to the bottom surface of cabinet 13.

The particular embodiment of the receiver shown and described herein illustrates a cabinet employing surround lighting, which is provided by a fluorescent lamp 33. An opaque light shield 35 is mounted upon cabinet 13 to block the light radiating from lamp 33 over substantially the rearward half of its surface and to direct the light toward the front of the cabinet. The bottom part of shield 35 is formed about the edge of the cabinet, while the sides and top of the shield are affixed to the sides and top of cabinet 13 by means of screws 37. Picture tube 11 is framed with a translucent plastic mask 39, which is mounted to circumscribe the periphery of the tube. The mask is held in position by means of its engagement with trim rail 27 and with the edges of face plate 25.

A filter lens 41 is mounted to cover the viewing area of picture tube 11. This lens is wedged between light shield 35 and the glass viewing surface 36 of tube 11. For purposes of mounting the lens, a plurality of very thin resilient brackets 43 are employed. Spring clips 45 are mounted upon each bracket and threaded through the shield to assure a firm abutting relationship between these parts.

Filter lens 41 may be made of plastic material such as polystyrene, which has been color tinted to filter the predominant portions of the ambient light spectrum in a manner well understood in the art. Both the filter lens 41 and the viewing surface 36 of picture tube 11 have curvilinear or substantially spherical shapes. The radius of curvature of lens 41 is less than that of tube 11 so that the lens will contact the edges of tube 11 and will be spaced therefrom over the remaining portions. This spacing provides a confined air chamber 47. Since lens 41 is wedged between the surface of tube 11, mask 39 and shield 35, passage of air from or into the chamber is retarded. Air chamber 47 will vary in thickness at its center depending upon the radius of curvature of tube 11. For example, this chamber may have a center dimension thickness of 1/8 of an inch when tube 11 has a radius of curvature of 26 inches. However, it is to be understood that the invention is not limited to a particular tube or lens radius.

Due to the abutting relationships between glass face plate 25, mask 39, and lens 41, a second confined air chamber 49, having for example, a center dimension thickness of 1/8 of an inch, is formed between the lens and face plate. These two serially arrayed chambers 47 and 49 provide a buffer zone which retards the movement of glass fragments in the event of an implosion of the picture tube. In addition, since the radius of curvature of lens 41 is smaller than that of the picture tube, the angle of reflection of ambient light rays from its surface will be greater than from the surface of the tube. This condition enhances the contrast of the image for the observer since the light rays are reflected to positions more remote from the observer.

Although one embodiment of the invention has been shown and described, it will be apparent to those skilled in the art that various changes and modifications may be made therein without departing from the scope of the invention as defined by the appended claims.

What is claimed is:

1. In a television receiving apparatus, the combination comprising an image display tube having a substantially spherical viewing surface, a substantially spherical plastic lens having a smaller radius of curvature than said viewing surface, means for holding the peripheral portions of said lens in abutment with said surface to provide a first substantially confined air chamber, a glass face plate, and means connected to said peripheral portion holding means for holding said face plate in spaced relationship with said lens to provide a second substantially confined air chamber.

2. In a television receiving apparatus, the combination comprising an image display tube having a viewing surface, a plastic lens, pressure means for holding the center portion of said lens in spaced relationship with said viewing surface and the peripheral portion of said lens in contact with said viewing surface to provide a first substantially confined air chamber, a glass face plate, and means connected to said pressure means for holding said face plate in spaced relationship with said lens to provide a second confined air chamber.

References Cited in the file of this patent

UNITED STATES PATENTS

| | | | |
|---|---|---|---|
| 2,047,020 | Flaherty | July 7, | 1936 |
| 2,461,464 | Aronstein | Feb. 8, | 1949 |
| 2,497,660 | Devine | Feb. 14, | 1950 |
| 2,737,649 | Pifer | Mar. 6, | 1956 |